United States Patent Office 3,096,348
Patented July 2, 1963

3,096,348
QUATERNARY AMMONIUM SALTS OF 5-DIMETH-YL AMINO-3-FURANMETHANOLS
Rolf Denss and Hans Herbert Kühnis, Basel, Switzerland, assignors to Geigy Chemical Corporation, Ardsley, N.Y., a corporation of Delaware
No Drawing. Filed May 18, 1961, Ser. No. 110,866
Claims priority, application Switzerland May 19, 1960
4 Claims. (Cl. 260—347.7)

The present invention concerns new basic compounds of the tetrahydrofuran series having valuable pharmacological properties, as well as processes for the production thereof, and it concerns the intermediate products also obtained.

It has surprisingly been found that quaternary ammonium compounds of the general formula

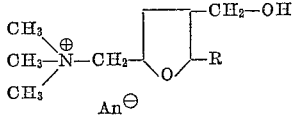

wherein
R represents hydrogen or a lower alkyl radical, and
$An^{\ominus}$ represents a monovalent anion or a normal equivalent of a polyvalent anion, have very strong muscarine-like activity, and possess acetyl-choline-like properties such as a strong stimulating action on parasympathetic nerve endings. They are useful for the treatment, by intravenous injection as aqueous solutions, of postoperative intestinal tract paresis and urinary bladder atony due to lesions of the spinal cord.

In the compounds of the general Formula I, a low alkyl radical R can be, for example, the methyl, ethyl, n-propyl, isopropyl, n-butyl, isobutyl or tert. butyl radical and $An^{\ominus}$ can be especially a bromine or iodine ion but other ions are suitable, for example a halogen ion, in particular an iodine, chlorine or bromine ion or the ion of methyl sulphuric acid. If an aqueous solution of compound I, for example the iodide or bromide, is mixed with an aqueous solution of tetraphenyl borate, the corresponding compound of Formula I wherein $An^{\ominus}$ is tetraphenyl borate is obtained.

To produce these compounds, a tertiary amine of the general formula

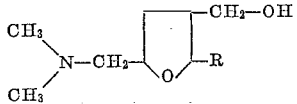

wherein R has the meaning given above, is reacted with a reactive ester of methanol. This reaction is performed, for example, in a suitable inert organic solvent such as acetone, butanone or ethyl acetate, at temperatures between 0–100° C., if necessary in an autoclave. Suitable reactive esters of methanol are, e.g. methyl iodide and dimethyl sulphate and, when the reaction is performed in an autoclave, also methyl bromide and methyl chloride.

Compounds of the general Formula I are also obtained if a reactive monoester of the hydroxyl group in the 2-position of a compound of the general formula

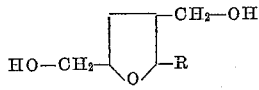

wherein R has the meaning given above, in particular a halide of the general formula

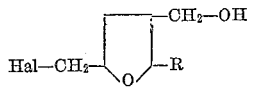

wherein Hal represents chlorine or bromine, is reacted with trimethylamine. The reaction is performed, for example, under similar conditions to the process first mentioned.

If desired, the quaternary salts, e.g. the iodides, first obtained are converted in the known manner into salts of other acids, for example, by liberation of the base and neutralisation with another acid or by double reaction with a suitable salt of another acid, e.g. by shaking a quaternary iodide with a silver chloride suspension, or by means of ion exchangers.

Starting materials of the general Formulae II and III can be obtained in various ways. A preferred process consists in reducing low α-allyl-alkanoyl acetic acid alkyl esters, e.g. the α-allyl acetoacetic acid ethyl ester or methyl ester, as well as the α-allyl propionyl acetic acid ethyl ester, α-allyl butyryl acetic acid ethyl ester of α-allyl isovaleryl acetic acid ethyl ester, by means of an alkali metal borhydride, to form low α-allyl-β-hydroxy-alkane carboxylic acid alkyl esters, e.g. the low α-allyl-β-hydroxybutyric acid alkyl esters, converting the latter by adding bromine and treating the addition product with an inorganic or a tertiary organic base into low 2-bromomethyl-5-alkyl tetrahydrofuran-4-carboxylic acid alkyl esters, eg.g low 2-bromo-methyl-5-methyl-tetrahydrofuran-4-carboxylic acid alkyl esters, converting these by reaction with dimethylamine into low 2-dimethylaminomethyl-5-alkyl-tetrahydrofuran-4-carboxylic acid alkyl esters of the general formula

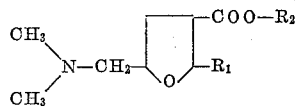

wherein $R_1$ and $R_2$ are low alkyl radicals, and reducing the latter by means of lithium aluminium hydride to form low 2-dimethylaminomethyl-4-hydroxymethyl-5-alkyl-tetrahydrofurans which are embraced by the general Formula II.

Compounds of the general Formula V can also serve as intermediate products in other syntheses. For example, esters containing a methyl radical as $R_1$ can be converted into the hydrazide and this can be converted by the Curtius degradation process and treatment of the amine with nitrous acid into allo-normuscarine.

On treating the known 2-hydroxymethyl-4-pentene-1-ol with bromine and then with an inorganic base or a tertiary organic base, 2-bromomethyl-4-hydroxymethyl-tetrahydrofuran, which is embraced by the general Formula III, is obtained and, from this, by reaction with dimethylamine, 2-dimethylaminomethyl-4-hydroxymethyl-tetrahydrofuran is obtained as compound of the general Formula II containing a hydrogen atom as radical R. To produce other starting materials of the general Formula III, for example, low α-allyl-alkanoyl acetic acid alkyl esters are reduced with lithium aluminium hydride to 1-alkyl-2-hydroxymethyl-4-pentene-1-ols, e.g. α-allyl-acetoacetic acid ethyl ester is reduced to 3-hydroxymethyl-5-hexene-2-ol.

On treating the reduction products mentioned with bromine and an inorganic base or a tertiary organic base, low 2 - bromomethyl-4-hydroxymethyl-5-alkyl-tetrahydrofurans are obtained therefrom, i.e. starting materials of the general Formula III having a low alkyl radical as radical R. If these are reacted with dimethylamine instead of with trimethylamine, then again starting materials of the general Formula II are obtained.

The following examples illustrate the production according to the invention of the new compounds without limiting the invention thereto. Parts are given therein as parts by weight and their relationship to parts by volume is as that of grammes to cubic centimetres. The temperatures are in degrees centigrade.

Example 1

(a) 11.6 parts of 2-hydroxymethyl-4-pentene-1-ol (produced according to J. Org. Chem. 14, 88 (1949)) are dissolved in 50 parts by volume of carbon tetrachloride and 15.9 parts of bromine dissolved in 20 parts by volume of carbon tetrachloride are added dropwise while stirring at −10 to 0°. The reaction mixture is then heated within 10 minutes to 10–20° whereupon 20 parts in all of finely pulverised potassium hydroxide are added in portions while stirring. The strongly exothermic reaction must be kept under control by external cooling. On completion of the addition, the reaction mixture is stirred for another 10 minutes at room temperature and then 100 parts of water are carefully poured in while cooling. The aqueous phase is isolated and washed several times with carbon tetrachloride; the combined carbon tetrachloride solutions are dried with sodium sulphate and concentrated. The 2-bromomethyl-4-hydroxymethyl-tetrahydrofuran obtained boils at 89–90° under 0.05 mm. pressure.

(b) 19.5 parts of the above bromide and 75 parts by volume of a methanolic solution containing 40% by weight of dimethylamine are heated in an autoclave for 8 hours at 90–100°. The solution is then concentrated and 100 parts by volume of concentrated caustic soda lye are added to the residue while cooling. The alkaline solution is exhaustively extracted with ether, the ether solution is dried with sodium sulphate and the ether is distilled off. The 2-dimethylaminomethyl-4-hydroxymethyltetrahydrofuran which remains boils at 64–66° under 0.001 mm. pressure.

(c) 15.9 parts of tetertiary base are dissolved in 100 parts by volume of acetone and 15 parts of methyl iodide dissolved in 20 parts by volume of acetone are added while cooling. The N-[4-hydroxymethyl-tetrahydrofuryl-(2)-methyl]-N,N,N-trimethyl-ammonium iodide, which generally separates as an oil, is crystallized from isopropyl alcohol whereupon it is obtained in the form of very hygroscopic crystals. In an evacuated capillary, both ends of which have been sealed, it melts at 87–88°.

Example 2

(a) 53.6 parts of lithium aluminium hydride in 1500 parts by volume of anhydrous ether are refluxed for 30 minutes. 60 parts of α-allylacetoacetic acid alkyl ester (produced according to Brühl, J. pr. (2) 50, 133) in 120 parts by volume of anhydrous ether are then so added dropwise that the solution boils. The reaction mixture is then refluxed for 4 hours and a mixture of 70 parts by volume of methanol and 30 parts by volume of water is added. The precipitate is filtered off and washed with ether, the filtrate is concentrated in vacuo at 40°, the residue is dissolved in ether, dried with sodium sulphate, filtered and concentrated in vacuo. The 3-hydroxymethyl-5-hexene-2-ol which remains is distilled under a high vacuum. It passes over at 80–82° under 0.003 mm. pressure.

(b) 20 parts of 3-hydroxymethyl-5-hexen-2-ol are dissolved in 60 parts by volume of carbon tetrachloride and 12.4 parts by volume of pyridine are added. 7.84 parts by volume of bromine in 32 parts by volume of carbon tetrachloride are then added dropwise within 15 minutes at 0–3° while stirring whereupon the reaction mixture is stirred for another 2 hours at room temperature. The precipitated pyridine hydrobromide is then filtered off and washed with carbon tetrachloride. The filtrate is concentrated in vacuo at 40°, the residue is dissolved in ether, dried with sodium sulphate, filtered and concentrated in vacuo. The 2-bromomethyl-4-hydroxymethyl-5-methyl-tetrahydrofuran so obtained boils at 103° under 0.005 mm. pressure.

(c) 15 parts of the above bromide and 40 parts by volume of anhydrous benzene which contains 22 parts by volume of dimethylamine, are heated for 15 hours at 120° in an autoclave. The solution is concentrated in vacuo, the residue is dissolved in 2-N-hydrochloric acid while cooling, extracted several times with ether, concentrated caustic potash solution is added while cooling and the whole is again exhaustively extracted with ether. The ether solution is dried with sodium sulphate, filtered, and concentrated in vacuo. The oily 2-dimethylaminomethyl-4-hydroxymethyl-5-methyl-tetrahydrofuran which remains distills at 81° under 0.005 mm. pressure.

(d) 5 parts of the tertiary base are dissolved in 30 parts by volume of acetone, 5 parts by volume of methyl iodide are added and the whole is refluxed for 2 hours. The reaction product which is obtained in oily form, is dissolved in water the aqueous solution is extracted with ether several times and concentrated under a water jet vacuum whereupon N-[4-hydroxymethyl-5-methyl-tetrahydrofuryl-(2)-methyl]-N,N,N-trimethyl-ammonium iodide remains.

(e) 1 part of the above quaternary salt is dissolved in 25 parts by volume of water and an aqueous solution of tetraphenyl borate is added until nothing more precipitates. The whole is then filtered, the residue is washed with water and dried. After crystallization from acetone/methanol, the N-[4-hydroxymethyl-5-methyl-tetrahydrofuryl-(2)-methyl]-N,N,N-trimethyl-ammonium tetraphenyl borate melts at 152–154°.

Example 3

(a) 680 parts of α-allyl-acetoacetic acid ethyl ester (produced according to Brühl, J. pr. (2) 50, 133) are dissolved in 4000 parts by volume of methanol. A solution of 76 parts of sodium borohydride in 684 parts by volume of water and 76 parts by volume of 2 N-caustic soda lye is poured in at −15° while cooling and stirring whereupon the reaction mixture is warmed to room temperature and concentrated in vacuo at 40°. The organic phase is then separated from the inorganic phase. The organic phase is dissolved in alkyl acetate, the solution is extracted several times with water, dried over sodium sulphate, filtered and the filtrate is concentrated in vacuo. The α-allyl-β-hydroxy-butyric acid ethyl ester which remains as an oil distills at 112–118° under 22 mm. pressure.

(b) 17.2 parts of α-allyl-β-hydroxy-butyric acid ethyl ester are dissolved in 50 parts by volume of carbon tetrachloride and 8.1 parts by volume of pyridine are added. 5.1 parts of bromine in 20 parts by volume of carbon tetrachloride are poured in at 0–5° while stirring and cooling. The temperature is then raised within 10–15 minutes to 20–25° whereupon the solution becomes slightly pale yellow coloured. The pyridine hydrobromide is then filtered off and washed with carbon tetrachloride, the filtrate is dried with sodium sulphate and the solution is concentrated in vacuo. The 2-bromomethyl-5-methyl-tetrahydrofuran-4-carboxylic acid ethyl ester so obtained can be further worked up direct or it can be purified by distillation under a high vacuum. It boils at 69–71° under 0.01 mm. pressure.

(c) 15 parts of the above bromide in 40 parts by volume of anhydrous benzene which contains 25 parts by volume of dimethylamine, are heated for 15 hours at 120° in an autoclave. The volume of the reaction mixture is then concentrated to about a third in vacuo, diluted with ether and extracted several times with 2 N-hydrochloric acid. The hydrochloric acid solution is washed with ether, made alkaline with concentrated caustic soda lye while cooling with ice and then exhaustively extracted with ether. The ether solution is dried with sodium sulphate and concentrated in vacuo. The 2-dimethylaminomethyl-5-methyl-tetrahydrofuran-4-carboxylic acid ethyl ester which remains as an oil boils at 80–82° under 0.02 mm. pressure.

(d) 15.96 parts of lithium aluminium hydride in 750 parts by volume of anhydrous ether are refluxed for 30 minutes. 45.16 parts of the above ester in 150 parts by volume of anhydrous ether are then so added dropwise that the solution boils. The reaction mixture is then refluxed for 3 hours, a mixture of 70 parts by volume of methanol and 30 parts by volume of water is added, the precipitate is filtered off and washed with ether. The filtrate is concentrated in vacuo, the residue is dissolved in ether, the solution is dried with sodium sulphate, filtered and concentrated in vacuo. The 2-dimethylaminomethyl-4-hydroxy-methyl - 5 - methyl-tetrahydrofuran which remains boils at 85–86° under 0.001 mm. pressure.

(e) 4 parts of the tertiary base are dissolved in 40 parts by volume of acetone, 4 parts by volume of methyl iodide are added and the whole is refluxed for 2 hours. The N-[4-hydroxy-methyl - 5 - methyl - tetrahydrofuryl - (2)-methyl]-N,N,N-trimethyl-ammonium iodide which separates as an oil is purified by dissolving in water and washing the solution with ether, and, finally, the aqueous solution is concentrated in vacuo.

*Example 4*

3 parts of the 2-bromo-methyl-4-hydroxymethyl-5-methyl-tetrahydrofuran described in Example 2b, in 40 parts by volume of acetone which contains 12.7 parts by volume of trimethylamine, are heated for 10 hours at 80° in an autoclave. After evaporating off the solvent, the oily reaction product which remains is dissolved in water, extracted with ether several times and the aqueous solution is then concentrated in vacuo. The N-[4-hy-droxy-methyl - 5 - methyl-tetrahydrofuryl - (2) - methyl] N,N,N-trimethyl-ammonium bromide so obtained can be converted in the manner described under (2e) into tetraphenyl borate which is identical with that described in (2e).

What we claim is:
1. A compound of the formula

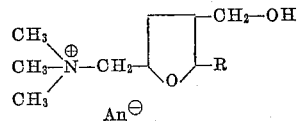

wherein

R is a member selected from the group consisting of hydrogen and lower alkyl and An$^\ominus$ is a pharmaceutically acceptable anion.

2. N-[4-hydroxymethyl - tetrahydrofuryl - (2) - methyl]-N,N,N-trimethyl-ammonium iodide.

3. N-[hydroxymethyl - 5 - methyl-tetrahydrofuryl-(2)-methyl]-N,N,N-trimethyl-ammonium iodide.

4. N-[4-hydroxymethyl - 5 - methyl - tetrahydrofuryl-(2)-methyl]-N,N,N-trimethyl-ammonium bromide.

References Cited in the file of this patent

Gill et al.: J. Chem. Soc., London (1958), pages 4728–31.